(12) United States Patent
Gamiz et al.

(10) Patent No.: US 12,287,775 B2
(45) Date of Patent: Apr. 29, 2025

(54) SMART REPOSITORY BASED ON RELATIONAL METADATA

(71) Applicant: The Boeing Company, Chicago, IL (US)

(72) Inventors: Alejandro Torres Gamiz, Madrid (ES); Juan Carlos Mendo Hernandez, Madrid (ES)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/177,486

(22) Filed: Feb. 17, 2021

(65) Prior Publication Data

US 2021/0263911 A1 Aug. 26, 2021

(30) Foreign Application Priority Data

Feb. 20, 2020 (EP) .................................... 20382123

(51) Int. Cl.
*G06F 16/23* (2019.01)
*G06F 16/16* (2019.01)
*G06F 16/2455* (2019.01)
*G06F 16/28* (2019.01)

(52) U.S. Cl.
CPC ........ *G06F 16/2379* (2019.01); *G06F 16/164* (2019.01); *G06F 16/24565* (2019.01); *G06F 16/284* (2019.01)

(58) Field of Classification Search
CPC ... H04L 67/101; H04L 67/1097; G06F 16/93; G06F 16/164; G06F 16/284; G06F 16/2379; G06F 16/23; G06F 16/264; G06F 16/2365; G06F 16/24565; G06F 16/908; G06F 16/9017; G06F 21/6218
See application file for complete search history.

(56) References Cited

U.S. PATENT DOCUMENTS

| 8,996,592 B2 * | 3/2015 | Bardsley ................ G06F 16/14 707/694 |
| 11,704,431 B2 * | 7/2023 | Kraus ................ H04L 63/0414 726/26 |
| 2013/0138424 A1 * | 5/2013 | Koenig ................ G10L 21/00 704/9 |

(Continued)

OTHER PUBLICATIONS

Extended European Search Report mailed Jun. 23, 2020 for European Patent Application No. 20382123.6, 11 pages.

*Primary Examiner* — Marcin R Filipczyk
(74) *Attorney, Agent, or Firm* — Alleman Hall & Tuttle LLP

(57) ABSTRACT

Methods, servers, and computer program products are provided to link files stored in a data repository. A file to be stored in the data repository is received, via a network, from a terminal. The method includes determining whether the file has a file metadata card associated with the file. The method further includes responsive to the file having a file metadata card associated with the file: executing at least one rule responsive to receiving the file being stored in the data repository to validate the file metadata card. The method further includes responsive to a result of the at least one rule executed indicating a successful result, storing the file metadata card associated with the file and the file in the data repository.

20 Claims, 13 Drawing Sheets

(56) References Cited

U.S. PATENT DOCUMENTS

| | | | |
|---|---|---|---|
| 2015/0026225 A1* | 1/2015 | Bastide | G06F 16/182 |
| | | | 707/825 |
| 2016/0188647 A1* | 6/2016 | Chang | G06F 16/122 |
| | | | 707/805 |
| 2017/0132413 A1 | 5/2017 | Augustyn | |
| 2021/0110105 A1* | 4/2021 | Smajic | G06F 3/0482 |

* cited by examiner

SMART REPOSITORY BASED ON RELATIONAL METADATA

CROSS-REFERENCE TO RELATED APPLICATIONS

The present application claims benefit of priority to European Patent Application No. 20382123.6, filed Feb. 20, 2020.

FIELD

The present disclosure relates generally to data repositories, and more particularly to methods and related devices supporting data repositories.

BACKGROUND

File repositories, sometimes referred to as "bookcases", are containers of data artifacts (e.g., "books") that can be accessed by multiple people online. Current technologies such as Dropbox, SharePoint or Google Drive provide basic file management mechanisms such as folder structures. More advanced repositories such as Git or SVN provide version control.

Files in current data repositories are stand-alone files not explicitly related to each other. For example, picture a repository with two files: "AccountsBalance.xlsx (Excel)" and "PresentationToStakeholders.ppt. The person in charge of two files knows in his/her mind (i.e. implicitly) that the presentation has to be updated if new data is added to the Excel datasheet and when the data in the Excel datasheet has changed, but the data repository does not.

This becomes a real problem when the repository does not contain two files, but thousands of files and when the person in charge of the data repository is not a team but thousands of people that can be globally distributed.

SUMMARY

NetDocuments, Dropbox, SharePoint, Google Drive and similar technologies allow file-sharing with limited degree of "smart" features, such as folder organization (e.g., arranging files hierarchically) of data structures and rudimentary version control (e.g., recovering previous versions of files), but are not able to validate the data committed to the repositories.

According to some examples of the disclosed subject matter, a method performed by a processor of a data repository to link files stored in the data repository is provided. The method includes receiving, via a network, a file to be stored in the data repository from a terminal. The method further includes determining whether the file has a file metadata card associated with the file. The method further includes, responsive to the file having a file metadata card associated with the file, executing at least one rule responsive to receiving the file being stored in the data repository to validate the file metadata card. The method further includes responsive to a result of the at least one rule executed indicating a successful result, storing the file metadata card associated with the file and the file in the data repository.

An advantage that can be achieved with the subject disclosure is that when there is a change to the repository that affects certain defined relations, the rules are enforced and actions (e.g. a notification) are triggered to ensure automated configuration and change management for repository (e.g., model) files that can be affected by the change. This improves the operation of the repository because files that are affected by the change are updated due to the enforcement of the rules. Files associated with each other can be obtained quicker.

In some examples, the at least one rule comprises at least one of an existence or availability of data or information rule, a consistency of data or information rule, an integrity of data or information rule and/or a data or information quality check rule. Responsive to a result of a rule of the at least one rule executed indicated a failed result, the method further includes performing an action.

In some examples of the subject disclosure, executing the at least one rule includes determining whether a named file is in a linking field of the file metadata card indicating the named file is to be updated when the file to be stored is updated. Responsive to the named file is in the linking field indicating the named file is to be updated, the method includes initiating transmission of a notification to at least one specified user of the named file to update the named file.

In some examples of the subject disclosure, a method includes responsive to the file not having a file metadata card associated with the file, providing a baseline file metadata card to the terminal for a user to populate fields of the baseline file metadata card. The method further includes responsive to the user populating the fields of the baseline file metadata card: associating the baseline file metadata card with the file as the file metadata card associated with the file and storing the file metadata card associated with the file and the file in the data repository.

In some examples of the subject disclosure, responsive to a linking field of the file metadata card being populated with a named file, a method includes updating a relational metadata map based on the named file to add a representation of a link between the file and the named file and adding a name of the file to the linking field of a named file metadata file card associated with the named file. The use of the relational metadata map in some examples may result in faster access times of related files since the relational metadata lists related files and a search query can use the existing listing of related files, thus reducing search times.

In some examples of the subject disclosure, a method includes responsive to the file not having a file metadata card associated with the file, determining a file type of the file. The method further includes determining a file metadata card template based on the file type. The method further includes providing the file metadata card template to the terminal for a user to populate fields of the file metadata card template. The method further includes responsive to the user populating the fields of the file metadata card template, executing the at least one rule to validate the file metadata card. The method further includes responsive to a result of the at least one rule executed being a successful result: storing the file metadata card template as the file metadata card associated with the file in the data repository and storing the file in the data repository.

In some examples of the subject disclosure, a method includes determining whether the file metadata card should be changed to a different file metadata card type based on a program stage of a development program associated with the file. The method further includes responsive to determining the file metadata card should be changed, changing the file metadata card based on the program stage of the development program.

Server and computer program product embodiments of the subject disclosure incorporate any of the above embodiments and permutations of the above embodiments of the subject disclosure.

BRIEF DESCRIPTION OF THE DRAWINGS

The accompanying drawings, which are included to provide a further understanding of the disclosure and are incorporated in and constitute a part of this application, illustrate certain non-limiting embodiments of the subject disclosure. In the drawings.

DETAILED DESCRIPTION

The subject disclosure will now be described more fully hereinafter with reference to the accompanying drawings, in which examples of embodiments of the subject disclosure are shown. The subject disclosure can, however, be embodied in many different forms and should not be construed as limited to the embodiments set forth herein. Rather, these embodiments are provided so that this disclosure will be thorough and complete, and will fully convey the scope of the subject disclosure to those skilled in the art. It should also be noted that these embodiments are not mutually exclusive. Components from one embodiment can be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments can be modified, omitted, or expanded upon without departing from the scope of the described subject matter.

Figure 10:
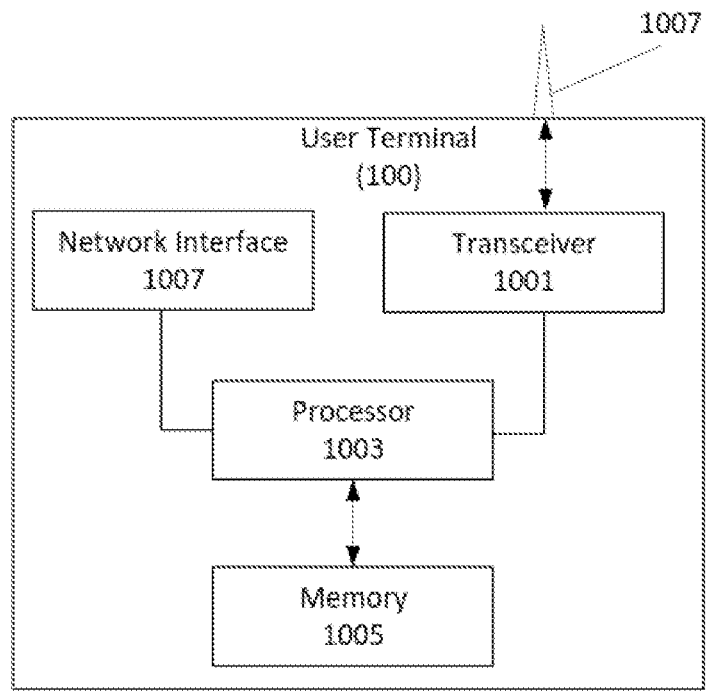
FIG. 10 is a block diagram illustrating a user terminal according to some embodiments of the subject disclosure.

FIG. 10 is a block diagram illustrating elements of a user terminal 100 (also referred to as a mobile terminal, a mobile communication terminal, a wireless communication device, a wireless terminal, a mobile device, a desktop device, a wired or wireless communication terminal, user equipment, UE, a user equipment node/terminal/device, etc.) configured to provide communication according to embodiments of the subject disclosure. As shown, user terminal 100 can include an antenna 1007 and transceiver circuitry 1001 (also referred to as a transceiver) including a transmitter and a receiver configured to provide uplink and downlink radio communications with a repository system server 120. User terminal 100 can also include processing circuitry 1003 (also referred to as a processor) coupled to the transceiver circuitry, and memory circuitry 1005 (also referred to as memory) coupled to the processing circuitry. The memory circuitry 1005 can include computer readable program code that when executed by the processing circuitry 1003 causes the processing circuitry to perform operations according to embodiments disclosed herein. According to some examples, processing circuitry 1003 can be defined to include memory so that separate memory circuitry is not required. User terminal 100 can also include an interface (such as a user interface) coupled with processing circuitry 1003.

As discussed herein, operations of user terminal can be performed by processing circuitry 1003 and/or transceiver circuitry 1001. For example, processing circuitry 1003 can control transceiver circuitry 1001 to transmit communications through transceiver circuitry 1001 over a radio interface to a repository system server and/or to receive communications through transceiver circuitry 1001 from a repository system server over a radio interface. Moreover, modules can be stored in memory circuitry 10, and these modules can provide instructions so that when instructions of a module are executed by processing circuitry 1003, processing circuitry 1003 performs respective operations of embodiments of the subject disclosure described herein.

Figure 11:
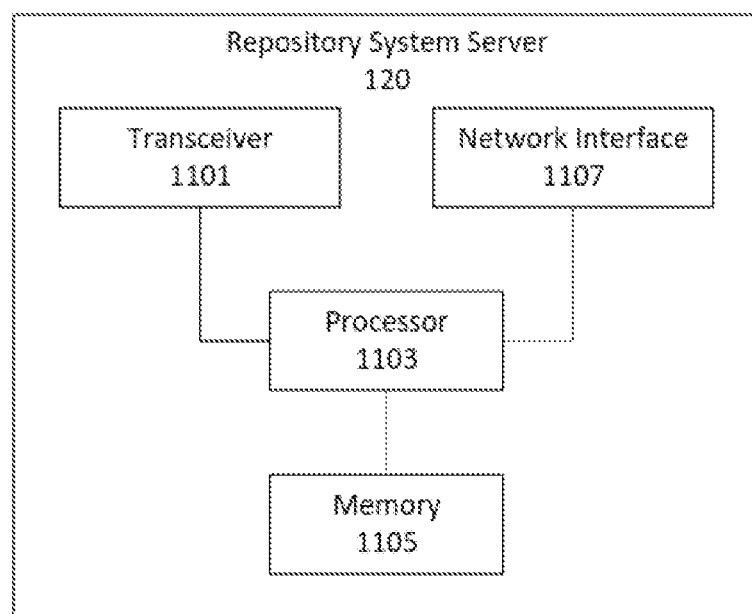
FIG. 11 is a block diagram illustrating a repository system server according to some embodiments of the subject disclosure.

FIG. 11 is a block diagram illustrating elements of a repository system server 120 configured to provide communication according to embodiments of the subject disclosure. As shown, the repository system server 120 can include transceiver circuitry 1101 (also referred to as a transceiver,) including a transmitter and a receiver configured to provide communications with user terminals. The repository system server 120 can include network interface circuitry 1107 (also referred to as a network interface) configured to provide communications with other servers. The repository system server 120 can also include processing circuitry 1103 (also referred to as a processor) coupled to the transceiver circuitry, and memory circuitry 1105 (also referred to as memory) coupled to the processing circuitry 1103. The memory circuitry 1105 can include computer readable program code that when executed by the processing circuitry 1103 causes the processing circuitry to perform operations according to embodiments disclosed herein. According to some examples, processing circuitry 1103 can be defined to include memory so that a separate memory circuitry is not required.

As discussed herein, operations of the repository system server 120 can be performed by processing circuitry 1103, network interface 1107, and/or transceiver 1101. For example, processing circuitry 1103 can control transceiver 1101 to transmit communications through transceiver 1101 over a radio interface to one or more user terminals and/or to receive communications through transceiver 1101 from one or more user terminals. Similarly, processing circuitry 1103 can control network interface 1107 to transmit communications through network interface 1107 to one or more user terminals and other servers and/or to receive communications through network interface from one or more user terminals and/or other servers. Moreover, modules can be stored in memory 1105, and these modules can provide instructions so that when instructions of a module are executed by processing circuitry 1103, processing circuitry 1103 performs respective operations of the repository system server 120.

As previously indicated, files in current repositories are stand-alone files not explicitly related to each other. This becomes a real problem when the repository does not contain two files, but thousands of them and when the person(s) in charge of the repository is not a team but thousands of people globally distributed.

There has to be then a system knowing how the thousands of files of the repository relate to each other to validate the cohesion and the effectiveness of the existing data to overcome the problem. Furthermore, a rational and a structured arrangement of the information can be a key for reusability (one of the main cost drivers when launching new complex programs).

Technologies used by Dropbox, SharePoint, Google Drive and similar technologies allow file-sharing with some degree of features, such as folder organization (e.g., files hierarchically) of data structures and rudimentary version control (e.g., recovery of previous versions of files). These technologies are not able to validate the data committed to the repositories (if we save a file in a folder, nothing will happen).

On the other hand, version control repositories such as Git control the data by implementing validation mechanisms that ensure that conflicting versions of the same file artifact will not be overlapped in the repository. For instance, if Git is not able to understand how an existing file is updated (i.e. the relation between the "before" and the "after"), it will issue a merge conflict forcing a user to check whether the update is pertinent.

This version control repositories have limitations in terms of complexity of the relationships they can understand and enforce for data validation, which are mainly limited to versioning.

The idea of ontology based database applied to a systems engineering development workflow consists of extracting data ("knowledge") from the original authoring tools directly (e.g. DOORS, Cameo, Simulink, etc.), translating it into a common knowledge representation framework and implement rules between different data sources An example implementation of an ontology based database is Reqtify, a 3DS application, that uses the previous concept to link requirements to development/implementation in order to enable traceability and impact analysis. Another implementation example is the System Knowledge Repository (SKR) by The Reuse Company that implements ontological rules on that data for quality, completeness and consistency checking.

The main drawback of using an ontology based database is that a specific software application programming interface (API) is required for each one of the tools involved in a development process. For example Dassault Systems has reported the development of more than 40 different APIs to link with TRA (the newest version of Reqtify). Many of the tools companies use are outside of that subset and would require development of new APIs to use the tools with such an ontology based database.

The subject disclosure provides a configuration and change management system based on a relational (model) file metadata that builds a common relational metadata map and specifies rules between the elements of that metadata map for configuration and change management purposes. The different elements are described below.

Figure 1:
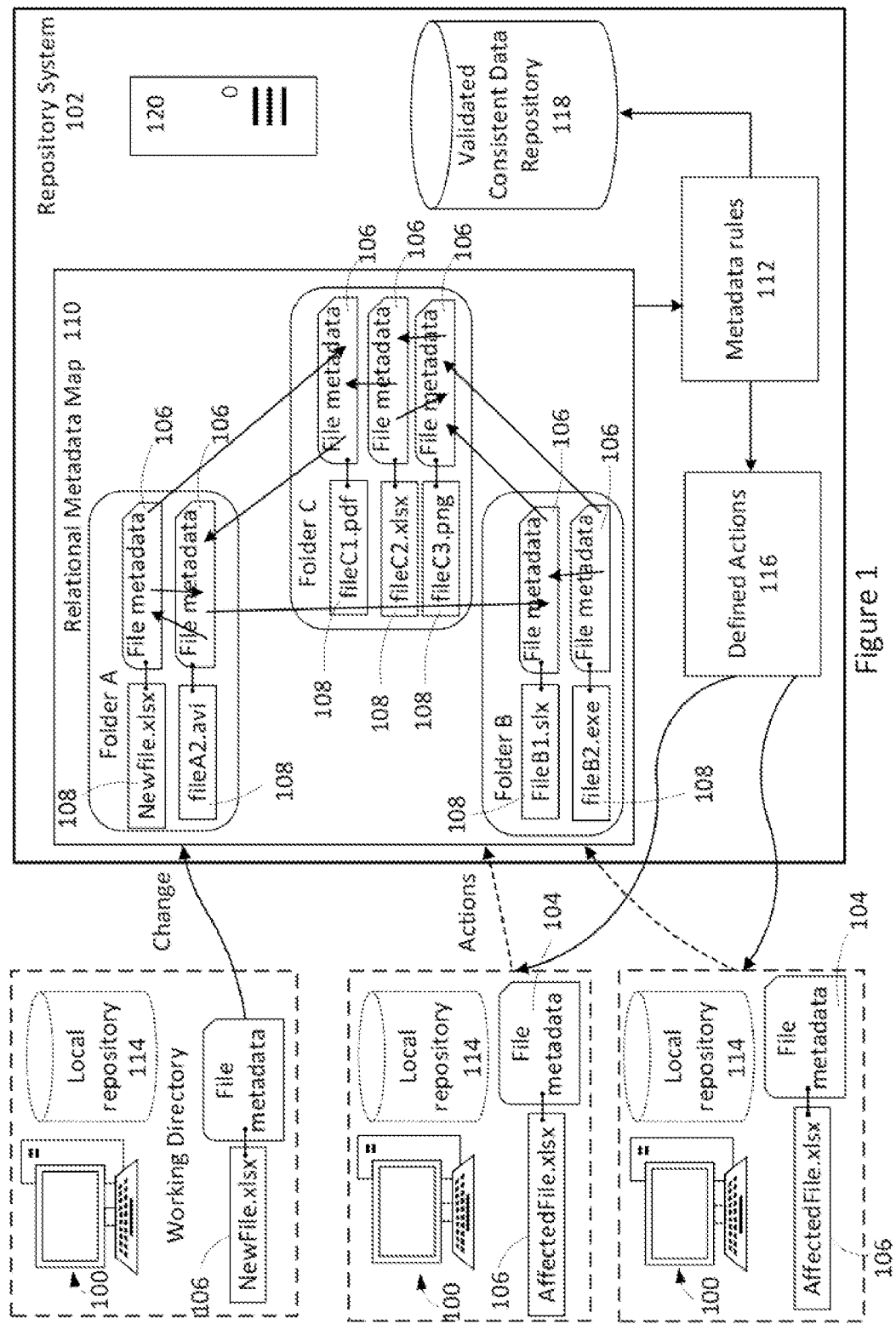
FIG. 1 is a block diagram of an implementation of a data repository in accordance with some embodiment of the subject disclosure.

Turning to FIG. 1, an operating environment is illustrated where user terminals 100 communicate with a repository system 102 having a server 120 that utilizes file metadata cards 106 associated with files 108, a relational metadata map 110 and relational metadata rules 112 is illustrated. The user terminals 100 can utilize a local repository 114 to locally store files 108 and file metadata cards 106.

A (Model) File Metadata Card 106 contains pieces of metadata exposed (e.g. attached to or contained in) for each file 108 in the repository system 102 (i.e. each file has its own respective metadata artifact). The file metadata cards 106 contain relational data, so that each one explains how the file 108 they refer to is integrated in the data repository context. Examples of relational metadata can be general file information such as fileID, author, date etc. but also file (model) specific metadata can be exposed, for example for detailed design MBD model file (e.g. Simulink) there can be metadata such as, but not limited to: element validity range, fidelity, ports and parameters, start and initial conditions, physical domain, validation level, model execution environment, solver settings, external libraries, real time computation settings, implementation language, implementation tool, and compiler.

The file metadata card 106 can also be referred to as a Model Identity Card (MIC) and it is applicable to model files and is valid for model files at different stages of the system development lifecycle (e.g. requirements model, architectural Systems Modeling Language (sysML) model, design MBD model, etc.).

A Relational Metadata Map 110 consists of a common representation and a set of links or references between all the (Model) File Metadata Cards 106 corresponding to the different repository artifacts (e.g. requirement models, sysML models, design model based design (MBD) models, documents, etc.). This relational metadata map can be understood as a map diagram working as glue logic to relate with each other all the files 106 by means of the respective exposed meta-data.

Relational Metadata Rules 112 are a set of customized conditionals that specify specific actions 114 to be taken depending on which relations (defined in the Relational Metadata Map 110) are not being fulfilled. Actions will be taken then to restore the data validity status of the repository.

As explained, (Model) File Metadata Cards 106 have relationships between each other, depending on which of them are fulfilled or violated, different actions 116 can be taken.

An example of relational metadata rule 112 where an action 116 that can be taken is an "update" relation. An example of the "update" relation is a first file's metadata card specifies that a second file has to be updated every time there is a change to the first file. When a user tries to change the first file without updating the second file, an update rule is triggered. The update rule requires that if a file has been modified (e.g., the first file), then all of the dependent files (e.g., the second file) with an update relation to the file that has been modified also have to be updated. If the dependent files are not updated, a notification can be sent to the authors of the dependent files that have not been updated.

Users that receive the notification realize the files need to be updated. When the files are updated, the repository 118 is a consistent and coherent set of data.

The repository system server 120 implements a process for automated configuration and change management. The server 120 is in charge of ensuring the validity of files and metadata file cards in the repository 118. To do that, every time a change to a file is committed to the repository 118, the system 102 will perform a series of operations according to the workflow described below:

Ensure each file has the right metadata file card associated with the file.

The relational metadata map 110 is updated with the pertinent relations, so that each file 108 is referenced to other files 108 when applicable.

When any of the existing metadata rules 112 applies to a file 108, compliance with those rules 112 will be assessed An action 116 (e.g. a notification) will be triggered indicating the compliance or un-compliance with the metadata rules 112.

Thus, the repository system 102 ensures that every time there is a change to the repository that affects certain predefined relations, the rules 112 are enforced and actions 116 (e.g., a notification) are triggered to ensure automated configuration and change management for all repository (model) files. The use of the relational metadata map in some examples may result in faster access times of related files since the relational metadata lists related files and a search query can use the existing listing of related files, thus reducing search times.

In order to better understand the subject disclosure, an example of an application shall now be described. A system supplier works with a company designing a subsystem in a collaborative environment using the repository system 102. The system supplier uploads a supplier model file 108 to the repository system 102 and a metadata file card 106 specified by the company with a series of fields to contextualize the file, such as, by way of example and not limitation:

The author or person in charge of developing the subsystem.

A reference to the requirements file the supplier model has to implement.

A reference to a product model used to integrate the supplier model for validation of the requirements (e.g., the supplier model with the verified requirement actually works well in the product model).

A field specifying if the supplier model requirements were verified (e.g., the supplier model does what the company specified to the supplier).

An example of the metadata rules 112 that can be used are:

Rule 1: When a file changes, the files implementing it should also change. An action will be triggered, sending an email to authors of those files, which will be required to update the implementation of the model to ensure data consistency of the repository.

Rule 2: If a file has an "authorized by" dependency, an email will be sent to the authorizing file owner, who will be able to either accept or reject the change.

Rule 3: "Requirements Verified" attributes of .model files have to be "Successful" to accept a change.

Rule 4: "Requirements Validated" attributes of .model files is set to "Fail" the BoeingSCD.pdf file has to be updated.

An example of how the repository system 102 can be used to detect that a supplier has been provided incorrect requirements shall now be described.

Figure 2:
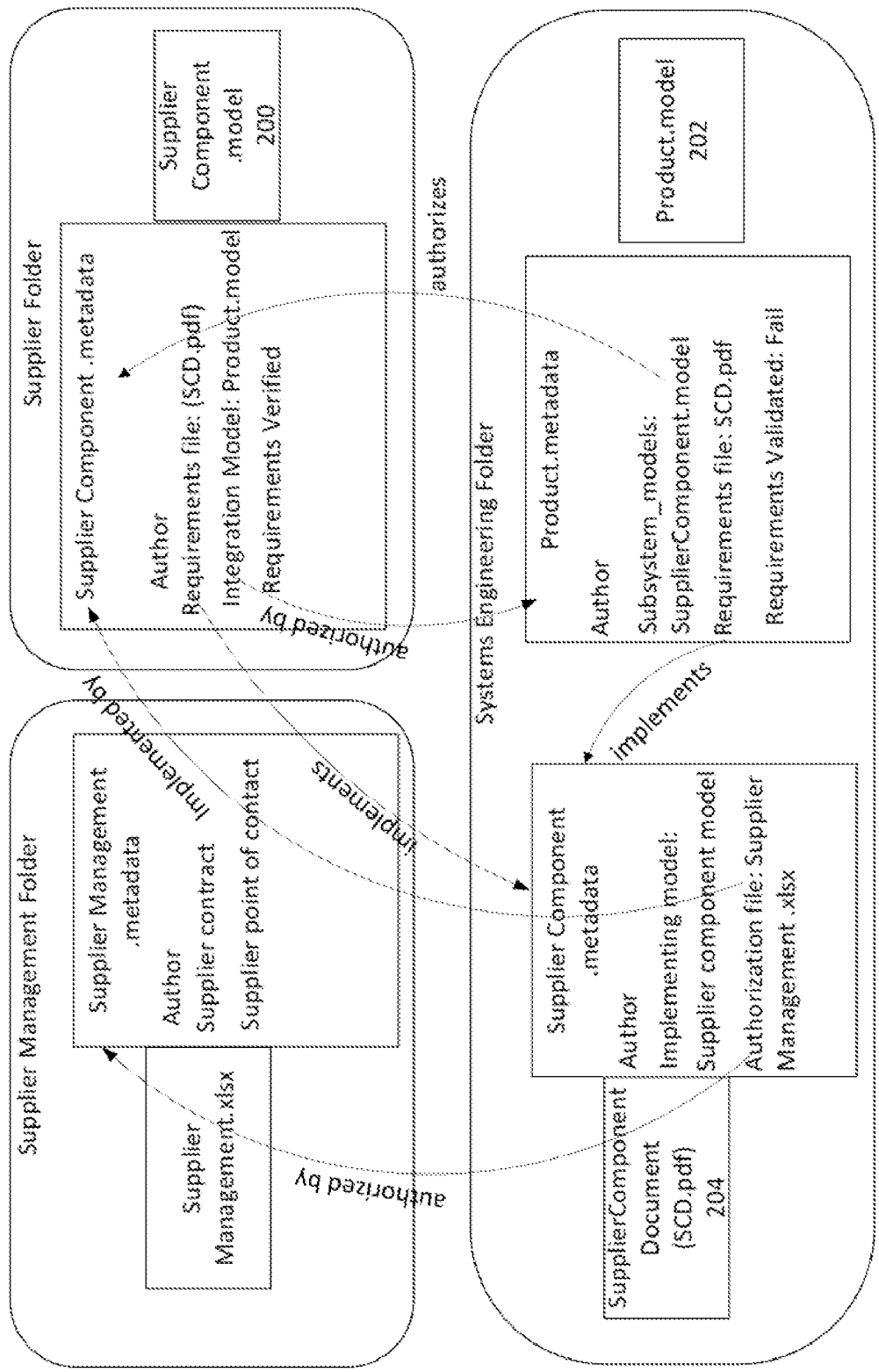
FIG. 2 is a diagram of a relational map according to some embodiments of the subject disclosure.

Turning to FIG. 2, the supplier commits a model 200 to the repository system 102 that successfully verifies the requirements file 204 (e.g. SupplierComponent Document (SCD).pdf) provided by the company to the supplier because the model 200 correct implements the requirements file. The repository system server 120 then seeks the authorization based on the "authorized by" dependency (Rule 2) in the metadata file card associated with the model, sending an email to the company engineer in charge of integrating the model for simulation to validate the requirements.

The integration fails, therefore the "Requirements Validated" attribute of product.model 202 is set to false. The repository system server 120 triggers actions because of Rule 4 to request a change to correct the incorrect requirements of the requirements file SCD.pdf The requirements file SCD.pdf 204 needs to be changed, so as it has an "Authorized by" (Rule 2) dependency and an email is sent to Supplier Management. The Supplier Management approves the change based on the contract with the supplier.

A new version of the requirements file SCD.pdf 204 solving the issues is committed to the repository system 102, which triggers Rule 1: The Product.model 202 and SupplierComponent.model 200 files have to be updated to accommodate this change to the requirements file SCD.pdf.

The supplier model change will request again authorization, which results in a successful validation and integration. The repository system server 120 has checked the data of the repository system 102, which are now consistent and releases a new stable version: Merge is complete.

Figure 3:
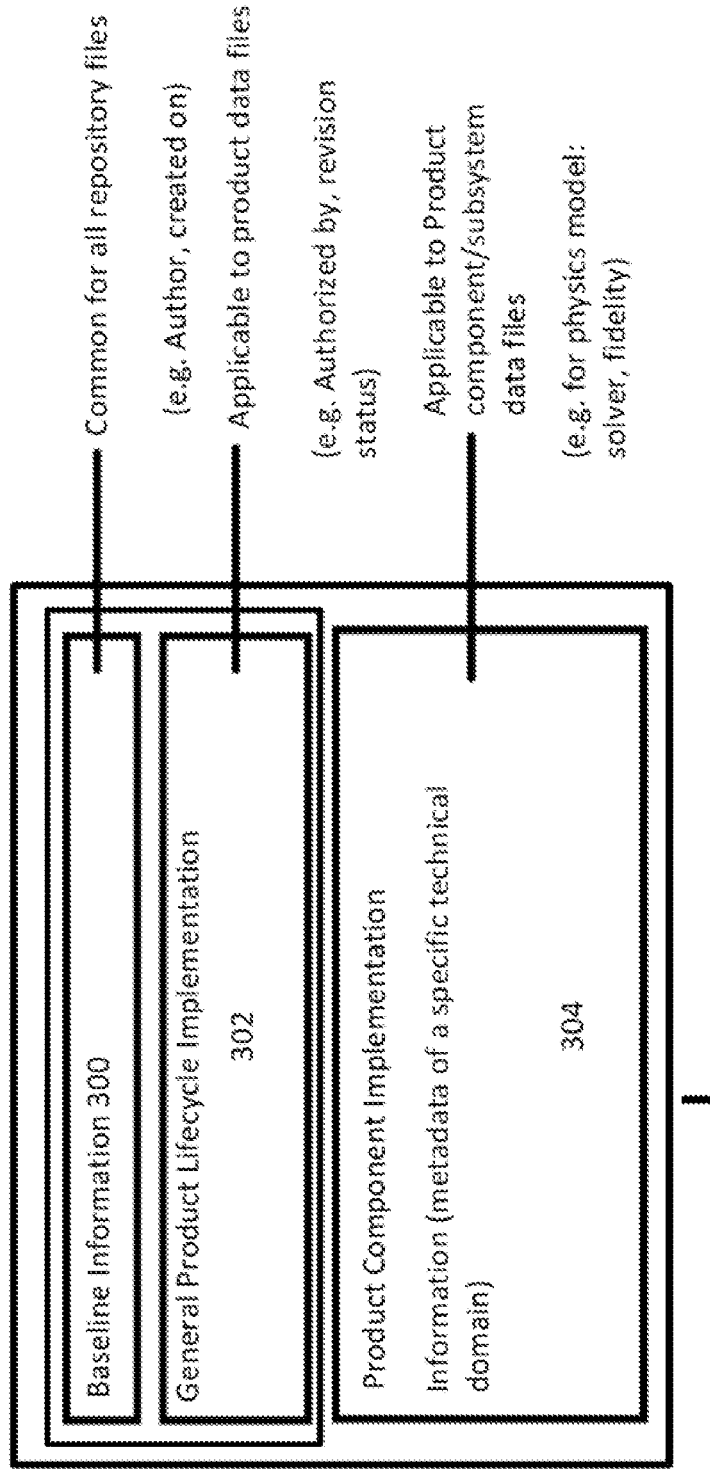
FIG. 3 is a block diagram illustrating a file metadata card according to some embodiments of the subject disclosure.

FIG. 3 illustrates an embodiment of a general file metadata card 106. The file metadata card 106 has a baseline information section 300, a general product lifecycle implementation section 302, and a product component implementation section 304. The baseline information section 300 provides common information (e.g., author, created on date, last save date, etc.) for all repository files 108. The general product lifecycle implementation section 302 provides information application to product data files (e.g., authorized by data, revision status, etc.). The product component implementation section provides information application to product component/subsystem data files (e.g. for a physics model: solver, fidelity, etc.).

Figure 4:
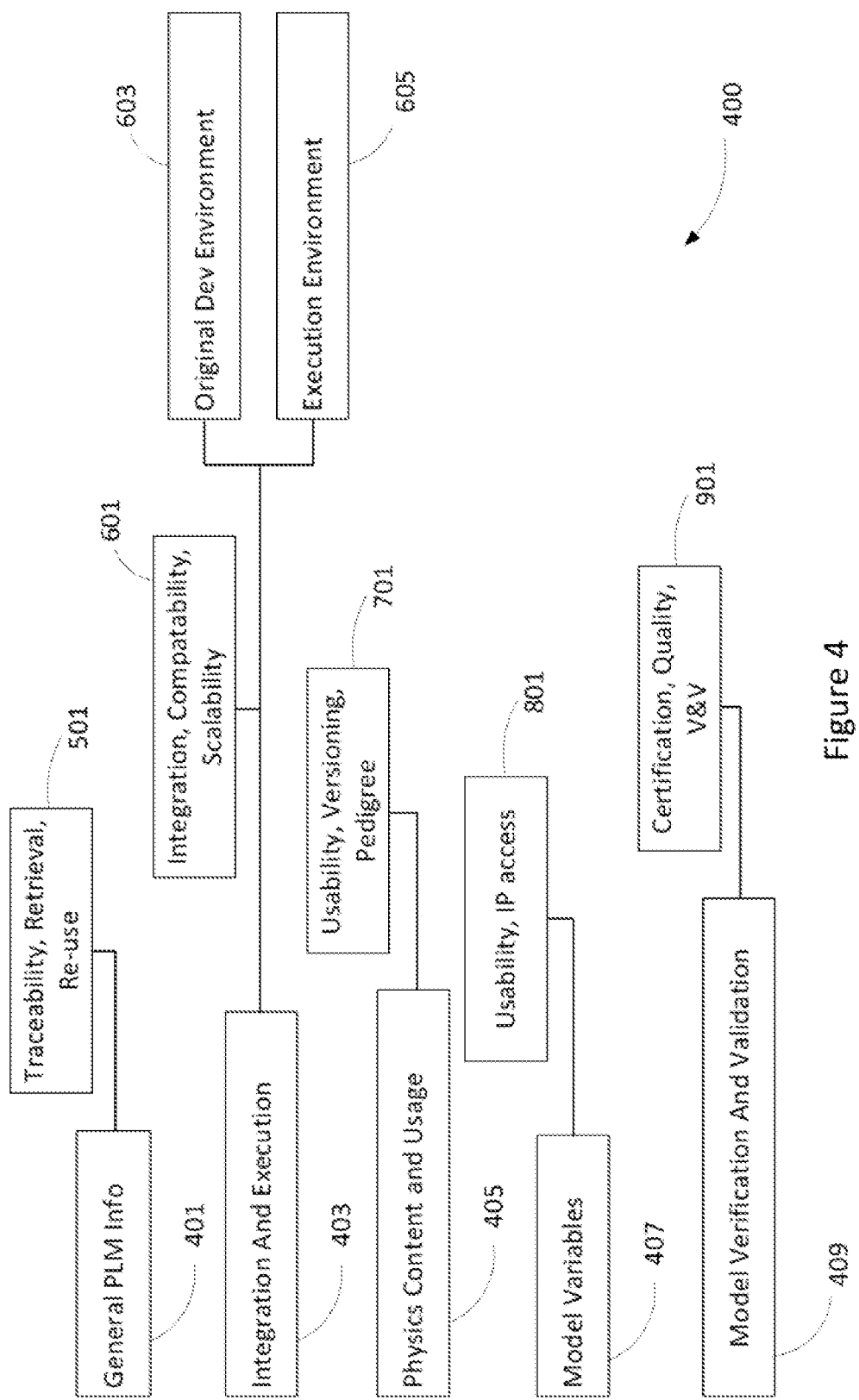
FIGS. 4-9 are block diagrams illustrating a file metadata card according to some embodiments of the subject disclosure.

A file metadata card 106 in some embodiments can be in a hierarchical form. FIGS. 4-9 illustrate an example of a hierarchical file metadata card 400 where FIG. 4 illustrates a top level of the hierarchical file metadata card. Sub-levels of the hierarchy are provided in FIGS. 5-9. In some examples, clicking on one of the left-most "buttons" 401 (general PLM info 401)), 403 (integration and execution 403), 405 (physics content and usage 405), 407 (model variables 407), or 409 (model verification and validation 409) brings up a second level of the hierarchical file metadata card. Clicking on button 401 brings up the metadata illustrated in FIG. 5. Clicking on button 403 brings up the metadata illustrated in FIG. 6. Clicking on button 405 bring up the metadata illustrated in FIG. 7. Clicking on button 407 bring up the metadata illustrated in FIG. 8. Clicking on button 409 bring up the metadata illustrated in FIG. 9.

FIG. 4 illustrates that some of the second level metadata fields can be listed at the top-level. For example, second level metadata fields traceability, retrieval, re-use 501, integration, compatibility, scalability 601, original dev environment 603, execution environment or execution type 605, usability, versioning, pedigree 701, usability, IP access 801, and certification, quality, V&V 901 are illustrated in FIG. 4. In some examples, clicking on traceability, retrieval, re-use 501 brings up the metadata illustrated in FIG. 5. Clicking on integration, compatibility, scalability 601 brings up the metadata in FIG. 6. Clicking on usability, versioning, pedigree 701 brings up the metadata in FIG. 7. Clicking on usability, IP access 801 brings up the metadata in FIG. 8. Clicking on certification, quality, V&V 901 brings up the metadata in FIG. 9.

Figure 5:
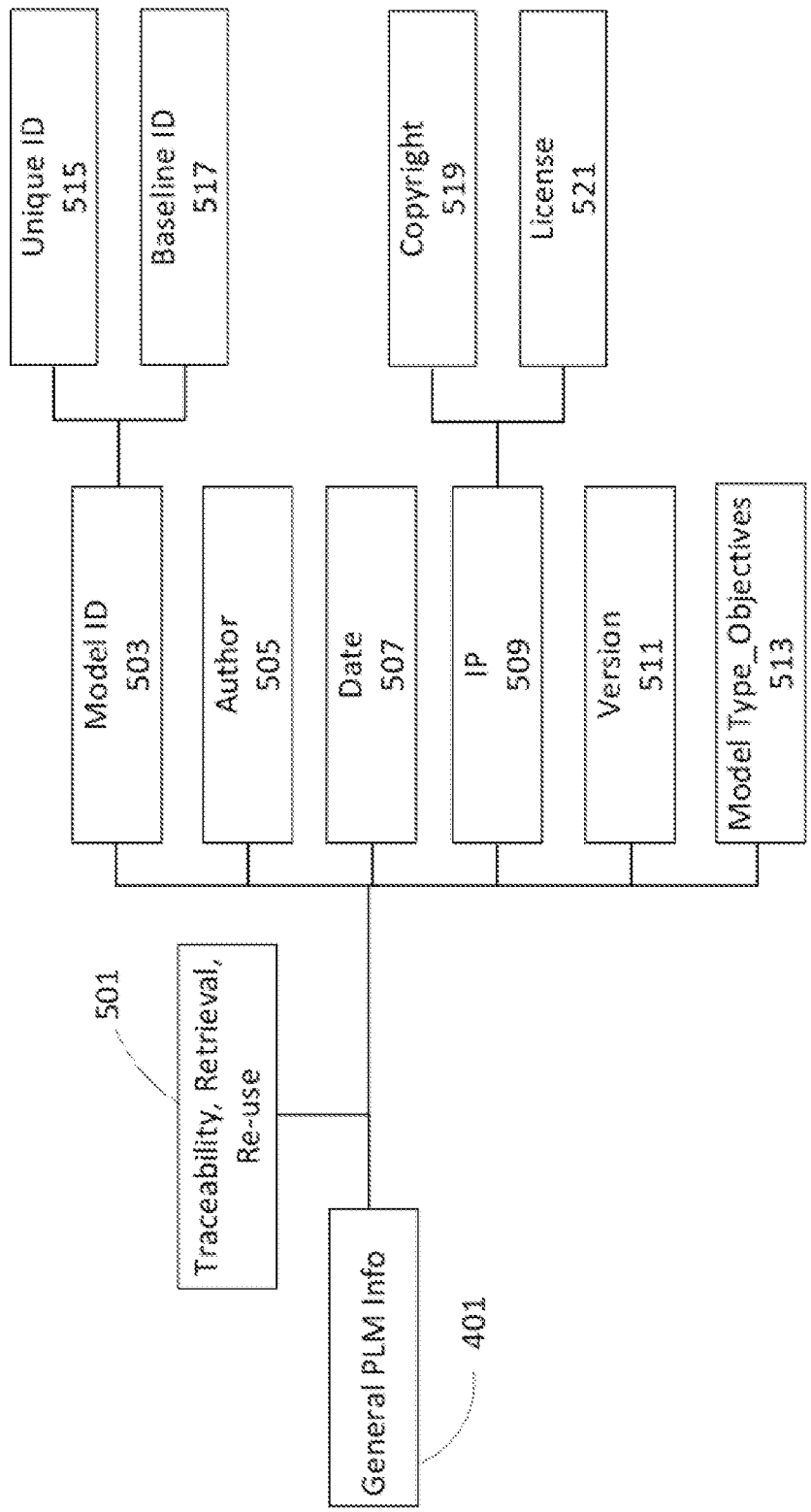

FIG. 5 illustrates second level metadata fields traceability, retrieval, re-use 501, model ID 503, author 505, date 507, IP 509, version 511, model type_objectives 513, unique ID 515, baselined ID 517, copyright 519, and license 521.

Figure 6:
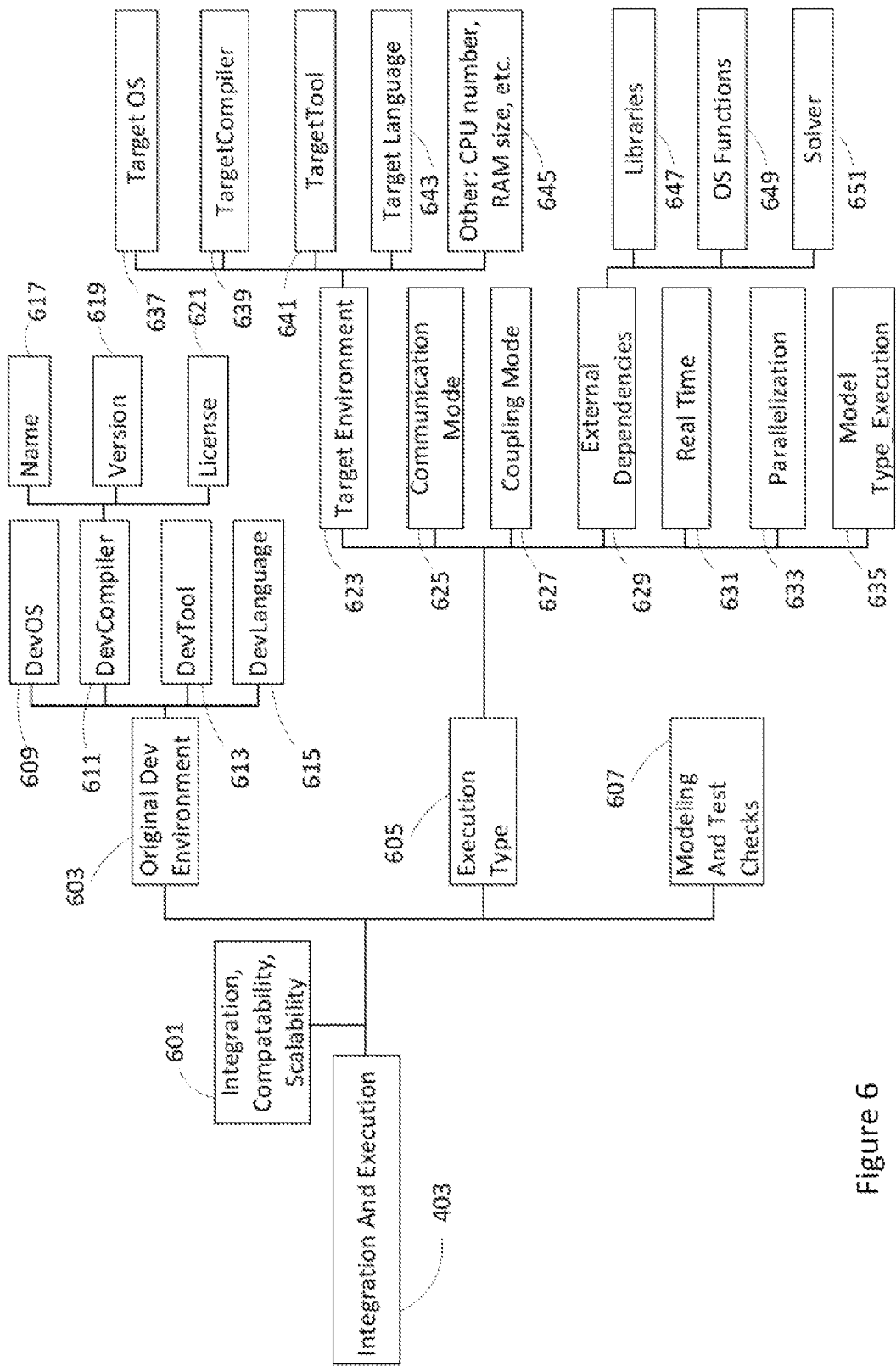

FIG. 6 illustrates second level metadata fields integration, compatibility, scalability 601, original dev environment 603, execution environment or execution type 605, modeling and test checks 607, dev OS 609, dev compiler 611, dev tool 613, dev language 615, name 617, version 619, license 621, target environment 623, communication mode 625, coupling mode 627, external dependencies 629, real time 631, parallelization 633, model type_execution 635, target OS 637, target compiler 639, target tool 641, target language 643, other: CPU number, RAM size, etc. 645, libraries 647, OS functions 649, and solver 651.

Figure 7:
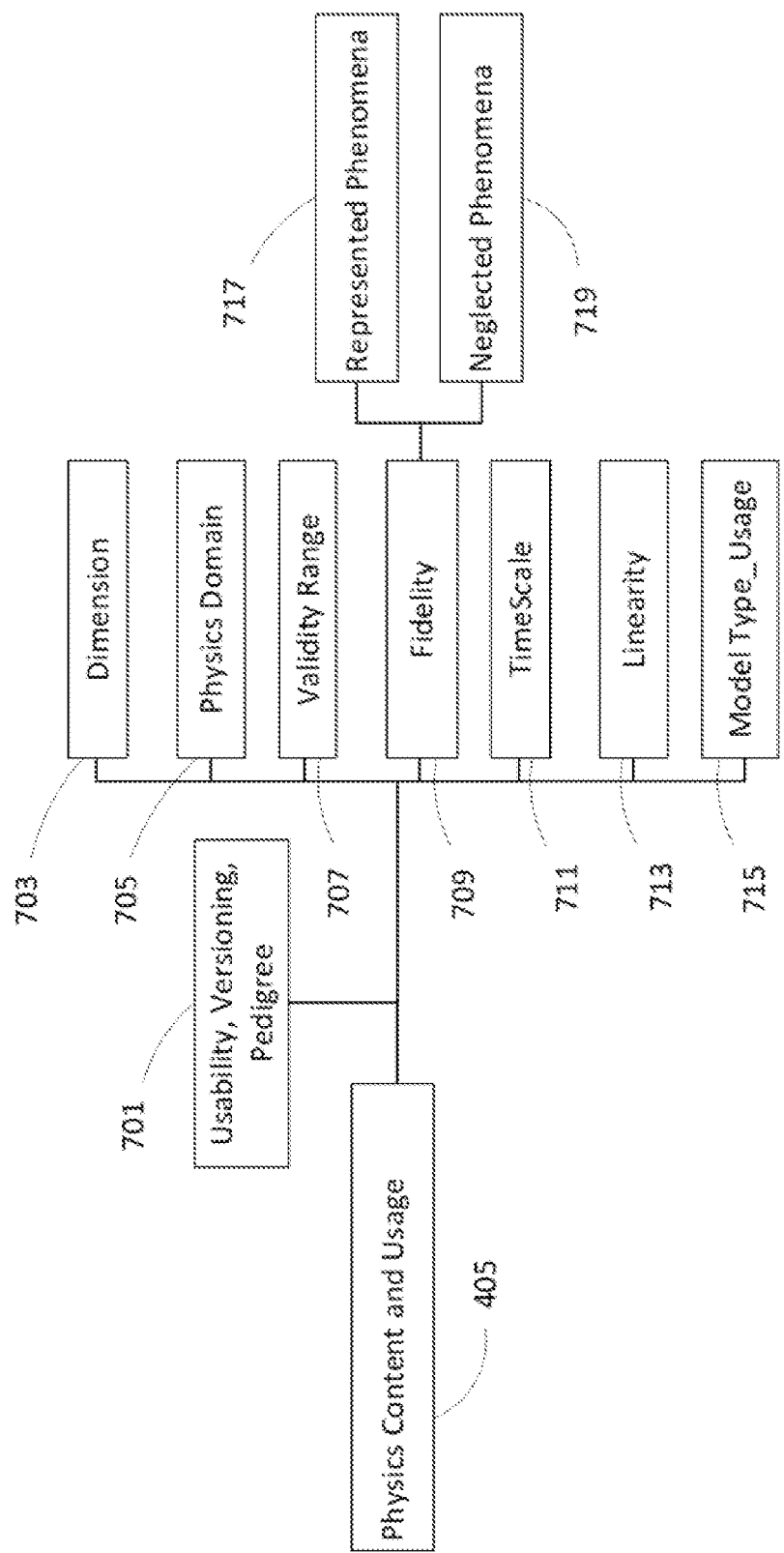

FIG. 7 illustrates second level metadata fields usability, versioning, pedigree 701, dimension 703, physics domain 705, validity range 707, fidelity 709, time scale 711, linearity 713, model type_usage 715, represented phenomena 717, and neglected phenomena 719.

Figure 8:
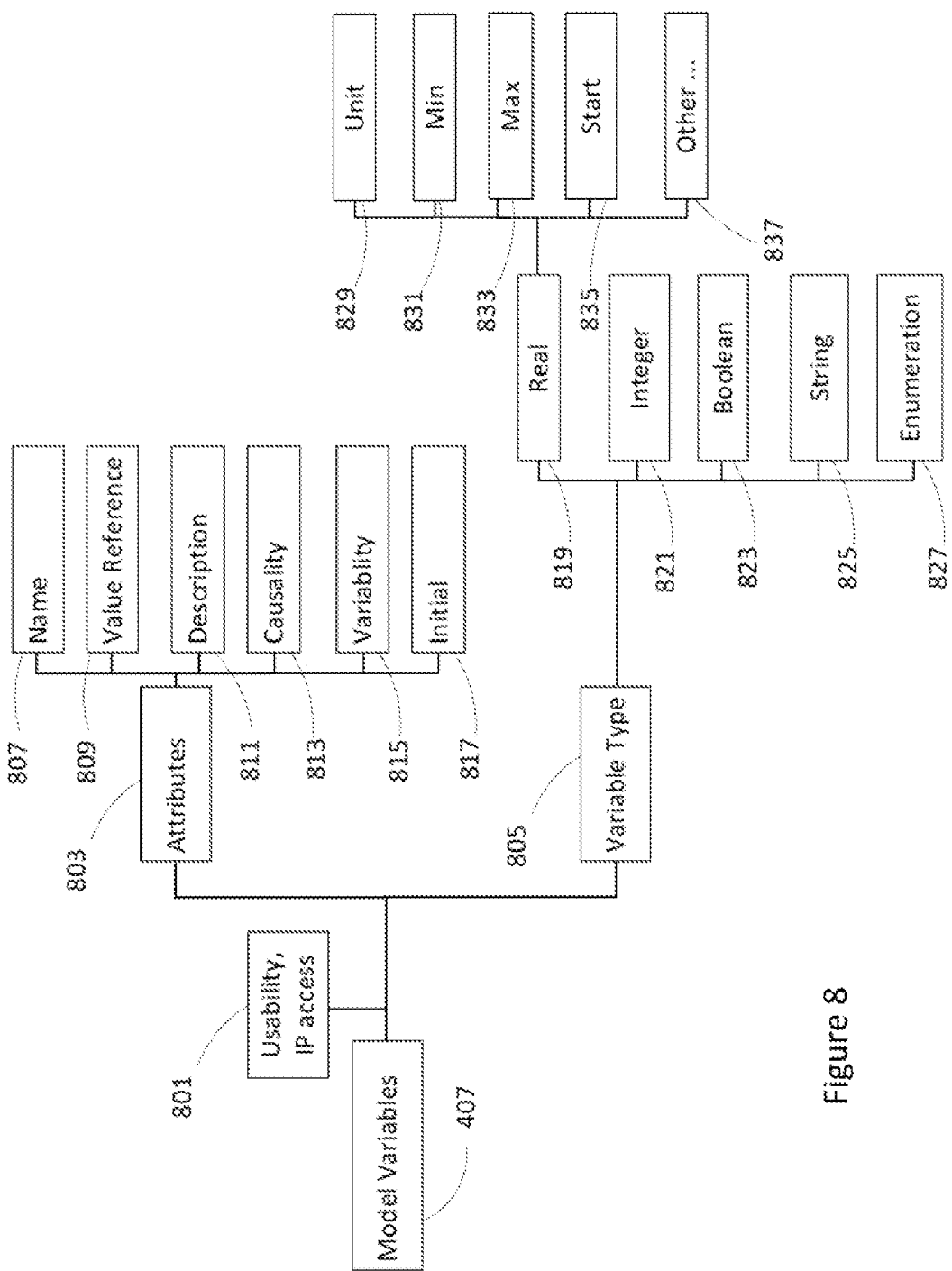

FIG. 8 illustrates second level metadata fields usability, IP access 801, attributes 803, variable type 805, name 807, value reference 809, description 811, causality 813, variability 815, initial 817, real 819, integer 821, Boolean 823, string 825, enumeration 827, unit 829, min 831, max 833, start 835, and other 837.

Figure 9:
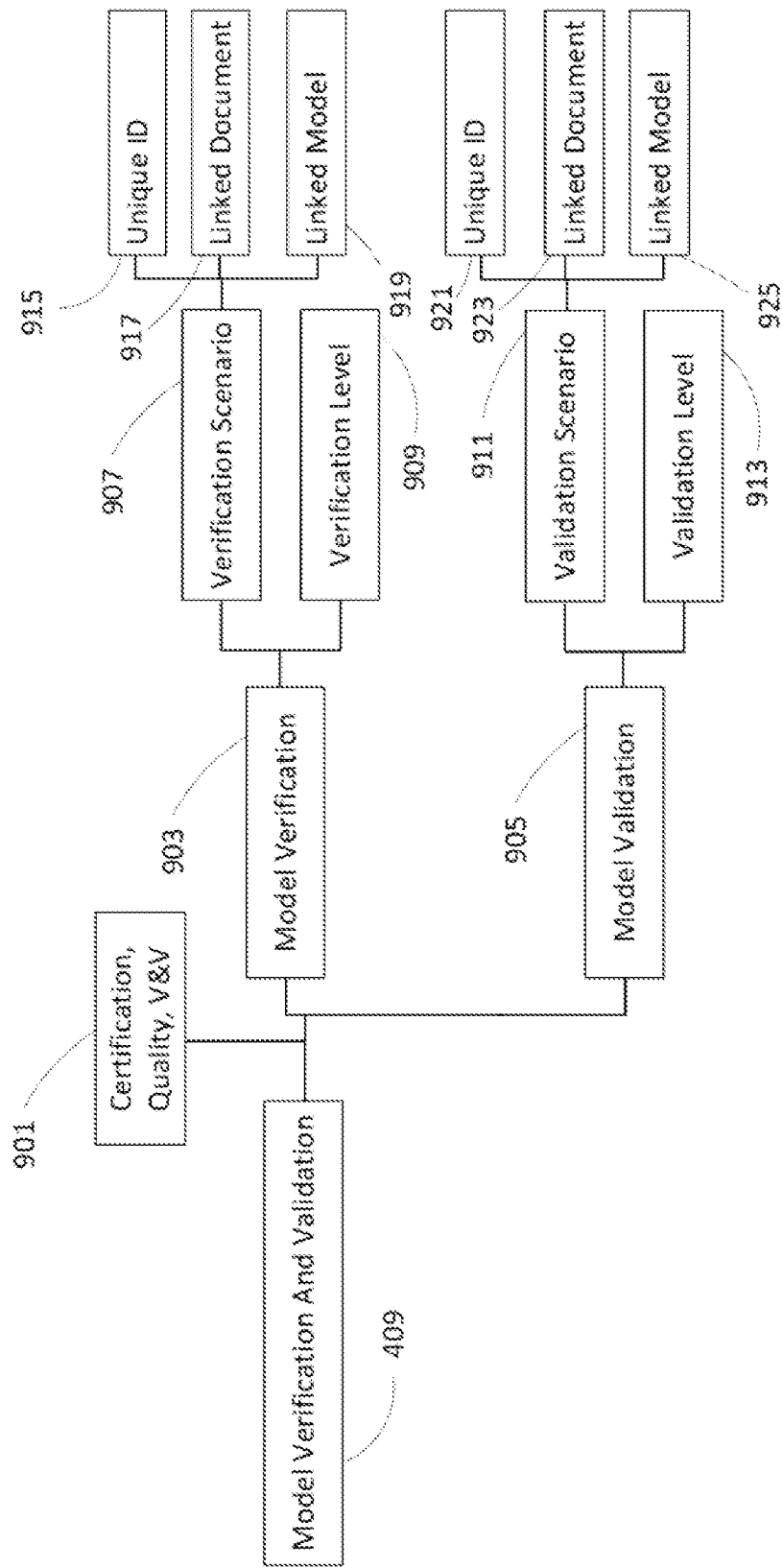

FIG. 9 illustrates second level metadata fields certification, quality, V&V 901, model verification 903, model validation 905, verification scenario 907, verification level 909, validation scenario 911, validation level 913, unique ID 915, linked document 917, linked model 919, unique ID 921, linked document 923, and linked model 925.

The author of the file metadata card 400 can specify which metadata fields in the file metadata card 400 are required. For example, depending on a product development stage, some fields such as version, development model used, etc. cannot be required to be filled out until the development stage reaches a defined milestone.

In some embodiments, some of the fields in a file metadata card 106, 400 can be prepopulated. For example, the name of a supplier model requirements file can have an authorized by field and a linking field (having names of files that have to be updated when the file associated with a file metadata card is updated) populated. Some fields cannot be prepopulated until a development stage reaches a defined milestone.

Operations of the repository system server 120 (implemented using the structure of the block diagram of FIG. 11) will now be discussed with reference to the flowcharts of FIGS. 12-17 according to some embodiments of the subject disclosure. For example, modules can be stored in memory 1105 of FIG. 11, and these modules can provide instructions so that when the instructions of a module are executed by respective processing circuitry 1103, processing circuitry 1103 performs respective operations of the flow charts.

Figure 12:
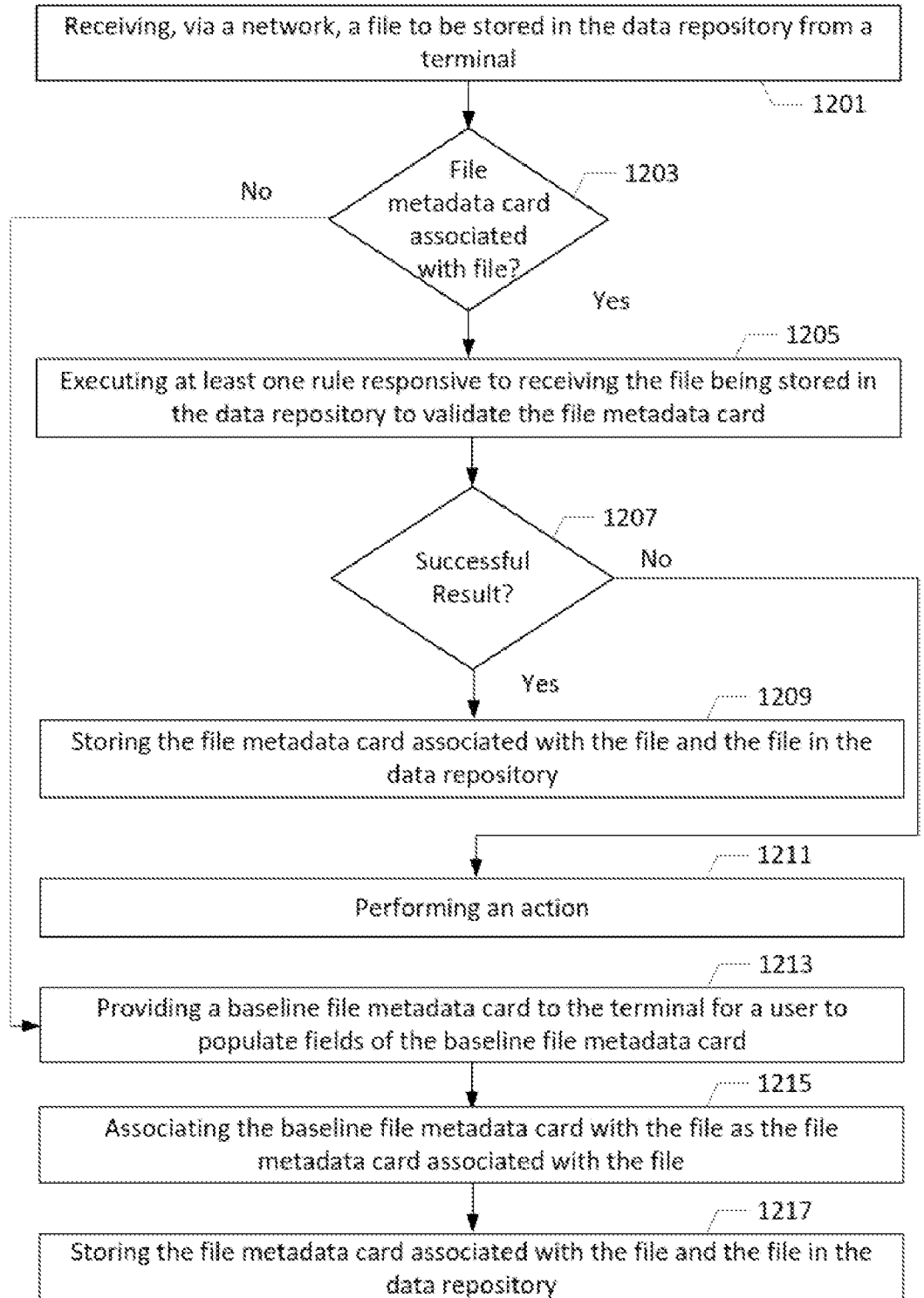
FIGS. 12-17 are flow charts illustrating operations of a data repository server according to some embodiments of the subject disclosure.

Turning now to FIG. 12, in block 1201, the processing circuitry 1103 receives, via a network, a file to be stored in a data repository from a terminal. For example, a user terminal 100 can send a file to be stored in repository system 102.

In block 1203, the processing circuitry 1103 determines whether the file has a file metadata card associated with the file. For example, the processing circuitry 1103 can use the relational metadata map 110 to determine if there is a file metadata card 106 associated with the file.

Responsive to the file having a file metadata card associated with the file, the processing circuitry 1103 in block 1205 executes at least one rule responsive to receiving the file being stored in the data repository to validate the file metadata card. For example, the file metadata card 106 associated with the file can have one or more metadata rules 112 specified for the file. In block 1207, the processing circuitry determines whether or not the rule executed results in a successful result (e.g., the rule is satisfied).

Responsive to a result of the at least one rule executed indicating a successful result, the processing circuitry 1103 in block 1209 stores the file metadata card 106 associated with the file and the file in the data repository (e.g., repository system 102).

Responsive to a result of the at least one rule executed indicating an unsuccessful result, the processing circuitry 1103 in block 1211 performs an action. For example, the processing circuitry 1103 can send a notification to an owner of a named file in linking field of the file metadata card. Other actions includes sending a notice to "authorized by" users, to a company's personnel to verify model operation, etc.

Responsive to the file not having a file metadata card associated with the file, the processing circuitry 1103 in block 1213 provides a baseline file metadata card to the terminal (e.g., a user terminal 100) for a user to populate fields of the baseline file metadata card.

The baseline metadata file card and the metadata file card described in various embodiments is created in some embodiments by creating a baseline information section 300 comprising baseline metadata having common information for all files in the data repository, wherein the baseline metadata comprises at least one of a file name, a file description, a date of creation, a date of modification, an identification of a version, and an identification of an author. At least one of a general product lifecycle implementation section 302 and/or a product component implementation section 304, is also created. Creating the general product lifecycle implementation section 302 includes creating general product lifecycle metadata associated with the file, wherein the general product lifecycle metadata includes at least one of a file unique ID, file maturity state, file revision status, file name, a file description, a date of creation, a date of modification, an identification of a version, and an identification of the file owner and an identification of an author. Creating the product component implementation section 304 includes creating product component information associated with the file, wherein the product component information includes information on at least one of information on virtual product component implementation metadata, related to the implementation, usage and execution associated with the underlying file that represents a product component or subsystem, wherein the specific model metadata can include at least one of a file validity range, a file fidelity, ports and parameters, start and initial conditions, physical domain, a validation level, a file execution environment, solver settings, external libraries, real time computation settings, implementation language, implementation tool, and compiler.

Responsive to the user populating the fields of the baseline file metadata card, the processing circuitry in block 1215 associates the baseline file metadata card with the file as the file metadata card associated with the file and, in block 1217, stores the file metadata card associated with the file and the file in the data repository.

Figure 13:
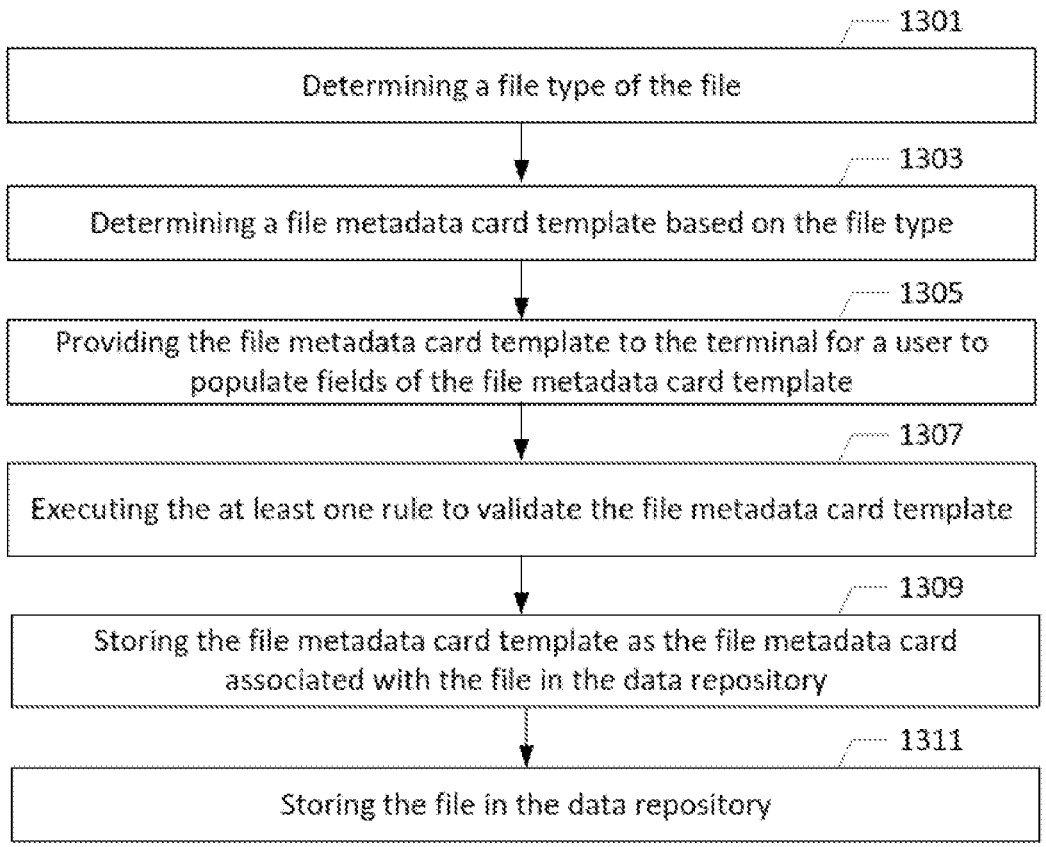

In some embodiments, the baseline file metadata card can be a file metadata card template that is based on a file type of the file. Turning to FIG. 13, the processing circuitry 1103, in block 1301, responsive to the file not having a file metadata card associated with the file, determines a file type of the file. For example, a file type can be a model type, a requirements document type, etc. In block 1303, the processing circuitry 1103 determines a file metadata card template based on the file type. In block 1305, the processing circuitry 1103 provides the file metadata card template to the terminal (e.g., user terminal 100) for a user to populate fields of the file metadata card template.

Responsive to the user populating the fields of the file metadata card template, the processing circuitry 1103 in block 1307 executes at least one rule to validate the file metadata card. In block 1309, responsive to a result of the at least one rule executed being a successful result, the processing circuitry 1103 stores the file metadata card template as the file metadata card associated with the file in the data repository. In block 1311, the processing circuitry 1103 stores the file in the data repository (e.g., repository system 102).

Figure 14:
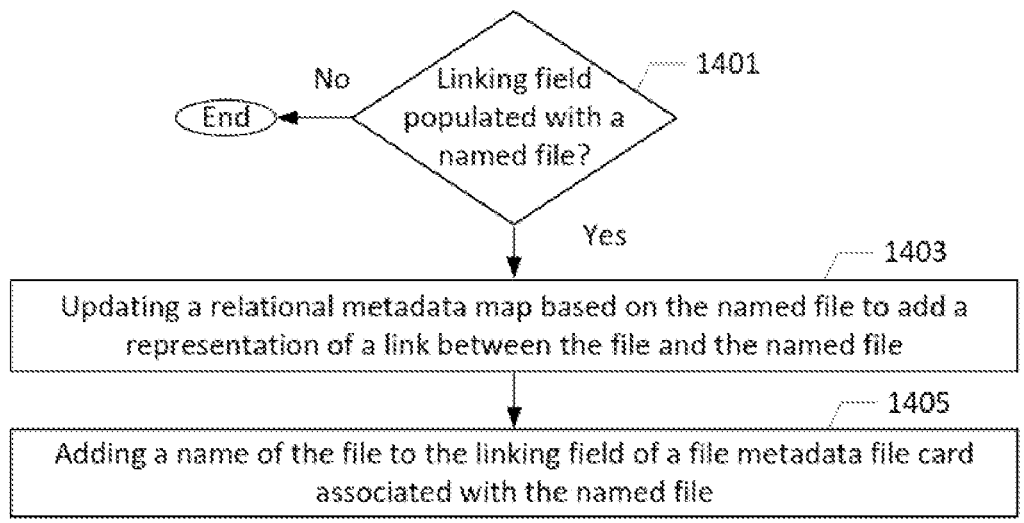

Turning to FIG. 14, the processing circuitry 1103 determines whether a user has populated a linking field of the file metadata card in block 1401. In block 1403, the processing circuitry 1103 updates a relational metadata map 110 based on the named file to add a representation of a link between the file and the named file. In block 1405, the processing circuitry 1103 adds a name of the file to the linking field of a file metadata file card associated with the named file.

Figure 15:
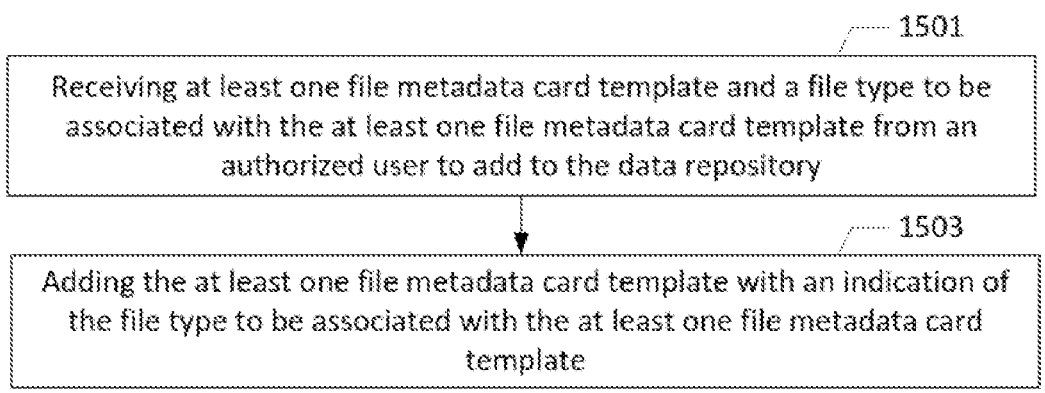

A user can create a file metadata card template to use for a file type. For example, a user responsible for a development subsystem can specify a file type for the subsystem such as a name of the subsystem in the name of the file, an abbreviation in the file extension, etc. Turning to FIG. 15, the processing circuitry 1103 in block 1501 receives at least one file metadata card template and a file type to be associated with the at least one file metadata card template from an authorized user to add to the data repository (e.g., repository system 102). In block 1503, the processing circuitry 1103 adds the at least one file metadata card template to the data repository with an indication of the file type to be associated with the at least one file metadata card template.

Figure 16:
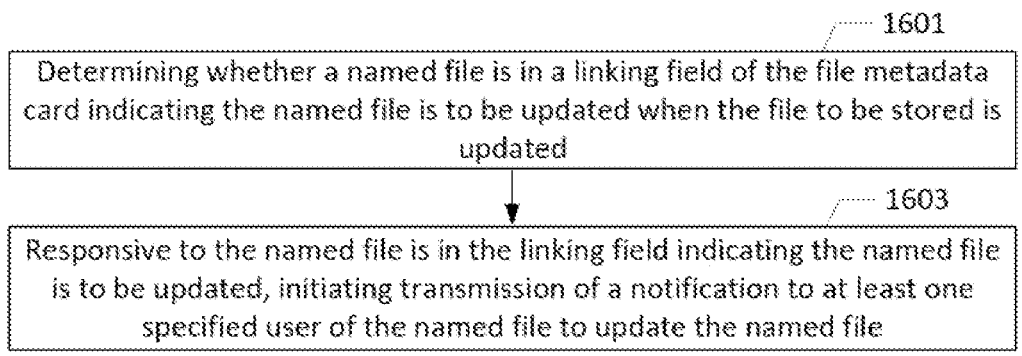

Turning to FIG. 16, responsive to the processing circuitry 1103 receiving a file metadata card with a file that has been updated, the processing circuitry 1103 in block 1601 determines whether a named file is in a linking field of the file metadata card indicating the named file is to be updated when the file to be stored is updated. In block 1603, responsive to the named file is in the linking field indicating the named file is to be updated, the processing circuitry 1103 initiates transmission of a notification to at least one specified user of the named file to update the named file.

Figure 17:
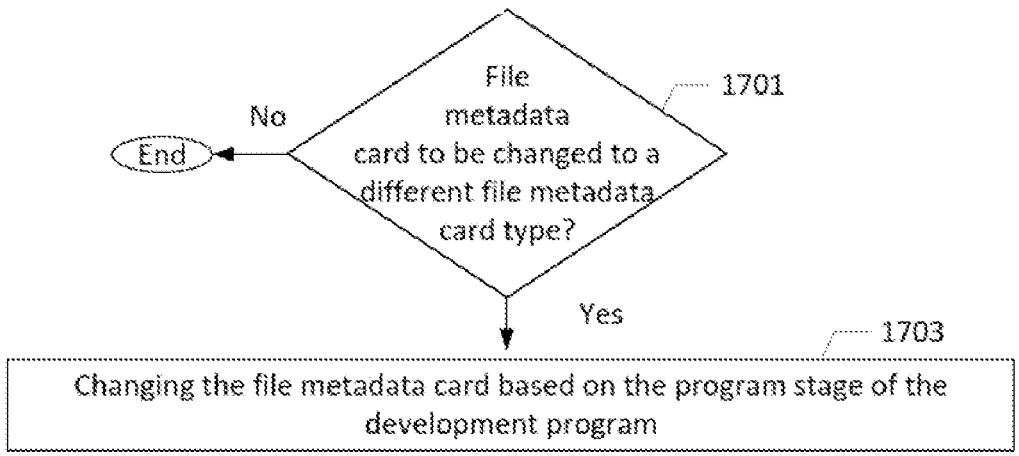

As previously indicated, a file metadata card can be changed by an authorized user. For example, the file metadata card can be different for different stages of a development program. Turning to FIG. 17, the processing circuitry 1103 in block 1701 determines whether the file metadata card should be changed to a different file metadata card type based on a program stage of a development program associated with the file. In block 1703, the processing circuitry 1103, responsive to determining the file metadata card should be changed, changes the file metadata card based on the program stage of the development program.

Various operations from the flow chart of FIG. 12 can be optional with respect to some embodiments of repository system servers and related methods. Regarding methods of claim 1 (set forth below), for example, operations of blocks 1211-1217 of FIG. 12 can be optional.

Further, the disclosure comprises embodiments according to the following clauses:

Clause 1. A method performed by a processor of a data repository to link files stored in the data repository, the method comprising:
receiving, via a network, a file to be stored in the data repository from a terminal;
determining whether the file has a file metadata card associated with the file;
responsive to the file having a file metadata card associated with the file:
executing at least one rule responsive to receiving the file being stored in the data repository to validate the file metadata card;
responsive to a result of the at least one rule executed indicating a successful result, storing the file metadata card associated with the file and the file in the data repository.

Clause 2. The method of Clause 1, wherein the at least one rule comprises at least one of an existence or availability of data or information rule, a consistency of data or information rule, an integrity of data or information rule and/or a data or information quality check rule, the method further comprising:
responsive to a result of a rule of the at least one rule executed indicating a failed result, performing an action.

Clause 3. The method of any of clauses 1-2 wherein executing at least one rule comprises:
determining whether a named file is in a linking field of the file metadata card indicating the named file is to be updated when the file to be stored is updated; and
responsive to the named file is in the linking field indicating the named file is to be updated, initiating transmission of a notification to at least one specified user of the named file to update the named file.

Clause 4. The method of any of clauses 1-3, further comprising: responsive to the file not having a file metadata card associated with the file:
providing a baseline file metadata card to the terminal for a user to populate fields of the baseline file metadata card;
responsive to the user populating the fields of the baseline file metadata card:
associating the baseline file metadata card with the file as the file metadata card associated with the file; and
storing the file metadata card associated with the file and the file in the data repository.

Clause 5. The method of clause 4, further comprising:
responsive to a linking field of the file metadata card being populated with a named file:
updating a relational metadata map based on the named file to add a representation of a link between the file and the named file; and
adding a name of the file to the linking field of a named file metadata file card associated with the named file.

Clause 6. The method of any of clauses 1-5, further comprising: responsive to the file not having a file metadata card associated with the file:
determining a file type of the file;
determining a file metadata card template based on the file type;
providing the file metadata card template to the terminal for a user to populate fields of the file metadata card template;
responsive to the user populating the fields of the file metadata card template:
executing the at least one rule to validate the file metadata card; and
responsive to a result of the at least one rule executed being a successful result:
storing the file metadata card template as the file metadata card associated with the file in the data repository; and
storing the file in the data repository.

Clause 7. The method of any of Clauses 1-6, further comprising creating the metadata file card by:
creating a baseline information section comprising baseline metadata having common information for all files in the data repository, wherein the baseline metadata comprises at least one of a file name, a file description, a date of creation, a date of modification, an identification of a version, and an identification of an author;

creating at least one of a general product lifecycle implementation section and/or a product component implementation section, wherein:

creating the general product lifecycle implementation section comprises creating general product lifecycle metadata associated with the file, wherein the general product lifecycle metadata comprises at least one of a file unique ID, file maturity state, file revision status, file name, a file description, a date of creation, a date of modification, an identification of a version, and an identification of the file owner and an identification of an author; and creating the product component implementation section comprises creating product component information associated with the file, wherein the product component information comprises information on at least one of information on virtual product component implementation metadata, related to the implementation, usage and execution associated with the underlying file that represents a product component or subsystem, wherein the specific model metadata can comprise at least one of a file validity range, a file fidelity, ports and parameters, start and initial conditions, physical domain, a validation level, a file execution environment, solver settings, external libraries, real time computation settings, implementation language, implementation tool, and compiler.

Clause 8. The method of any of clauses 1-7, further comprising:

receiving at least one file metadata card template and a file type to be associated with the at least one file metadata card template from an authorized user to add to the data repository;

adding the at least one file metadata card template to the data repository with an indication of the file type to be associated with the at least one file metadata card template.

Clause 9. A server for linking files stored in a data repository, the server comprising:

processing circuitry; and memory coupled with the processing circuitry, wherein the memory includes instructions that when executed by the processing circuitry causes the server to perform operations comprising:

receiving, via a network, a file to be stored in the data repository from a terminal;

determining whether the file has a file metadata card associated with the file;

responsive to the file having a file metadata card associated with the file:

executing at least one rule responsive to receiving the file being stored in the data repository to validate the file metadata card;

responsive to responsive to a result of the at least one rule executed being a successful result, storing the file metadata card associated with the file and the file in the data repository.

Clause 10. The server of clause 9, wherein the memory includes further instructions that when executed by the processing circuitry causes the server to perform operations further comprising:

responsive to a result of a rule executed of the at least one rule indicating a failed result, performing an action.

Clause 11. The server of claim 9, wherein in executing the at least one rule, the server performs operations comprising:

determining whether a named file is in a linking field of the file metadata card indicating the named file is to be updated when the file to be stored is updated;

responsive to the named file is in the linking field indicating the named file is to be updated, initiating transmission of a notification to at least one specified user of the named file to update the named file.

Clause 12. The server of any of Clauses 9-11, wherein the memory includes further instructions that when executed by the processing circuitry causes the server to perform operations further comprising:

responsive to the file not having a file metadata card associated with the file:

providing a baseline file metadata card to the terminal for a user to populate fields of the baseline file metadata card;

responsive to the user populating the fields of the baseline file metadata card:

associating the baseline file metadata card with the file as the file metadata card associated with the file; and storing the file metadata card associated with the file and the file in the data repository.

Clause 13. The server of clause 12, wherein the memory includes further instructions that when executed by the processing circuitry causes the server to perform operations further comprising:

responsive to a linking field of the file metadata card being populated with a named file:

updating a relational metadata map based on the named file to add a representation of a link between the file and the named file; and adding a name of the file to the linking field of a file metadata file card associated with the named file.

Clause 14. The server of any of clauses 9-13, wherein the memory includes further instructions that when executed by the processing circuitry causes the server to perform operations further comprising:

responsive to the file not having a file metadata card associated with the file:

determining a file type of the file;

determining a file metadata card template based on the file type;

providing the file metadata card template to the terminal for a user to populate fields of the file metadata card template;

responsive to the user populating the fields of the file metadata card template:

storing the file metadata card template as the file metadata card associated with the file in the data repository; and storing the file in the data repository.

Clause 15. The server of any of clauses 9-14, wherein the memory includes further instructions that when executed by the processing circuitry causes the server to perform operations further comprising:

receiving at least one file metadata card template and a file type associated with the at least one file metadata card template from an authorized user to add to the data repository; and adding the at least one file metadata card template with an indication of the file type to be associated with the at least one file metadata card template.

Clause 16. The server of any of clauses 9-15, wherein the memory includes further instructions that when executed by the processing circuitry causes the server to perform operations further comprising:

determining whether the file metadata card should be changed to a different file metadata card type based on a program stage of a development program associated with the file;

responsive to determining the file metadata card should be changed, changing the file metadata card based on the program stage of the development program.

Clause 17. A computer program product comprising a non-transitory storage medium including program code to be executed by processing circuitry of a computing device configured to operate in a network, whereby execution of the program code causes the computing device to perform operations comprising:

receiving, via a network, a file to be stored in a data repository from a terminal;

determining whether the file has a file metadata card associated with the file;

responsive to the file having a file metadata card associated with the file:

executing at least one rule responsive to receiving the file being stored in the data repository to validate the file metadata card;

responsive to the file metadata card being validated, storing the file metadata card associated with the file and the file in the data repository.

Clause 18. The computer program product of clause 17, wherein the non-transitory storage medium includes further program code to be executed by processing circuitry of a computing device configured to operate in a network, whereby execution of the further program code causes the computing device to perform operations comprising:

responsive to a result of a rule executed of the at least one rule indicating a failed result, performing an action.

Clause 19. The computer program product of any of clauses 17-18 wherein in executing the at least one rule, the non-transitory storage medium includes further program code to be executed by processing circuitry of a computing device configured to operate in a network, whereby execution of the further program code causes the computing device to perform operations comprising:

determining whether a named file is in a linking field of the file metadata card indicating the named file is to be updated when the file to be stored is updated; and responsive to the named file is in the linking field indicating the named file is to be updated, initiating transmission of a notification to at least one specified user of the named file to update the named file.

Clause 20. The computer program product of any of Clauses 17-19, wherein the non-transitory storage medium includes further program code to be executed by processing circuitry of a computing device configured to operate in a network, whereby execution of the further program code causes the computing device to perform operations comprising:

responsive to the file not having a file metadata card associated with the file:

determining a file type of the file;

determining a file metadata card template based on the file type;

providing the file metadata card template to the terminal for a user to populate fields of the file metadata card template;

responsive to the user populating the fields of the file metadata card template:

executing the at least one rule to validate the file metadata card; and responsive to a result of the at least one rule executed being a successful result:

storing the file metadata card template as the file metadata card associated with the file in the data repository; and storing the file in the data repository.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the examples disclosed herein can be applied to any other embodiment, wherever appropriate. Likewise, any advantage of any of the examples can apply to any some examples, and vice versa. Other objectives, features and advantages of the enclosed embodiments will be apparent from the following description.

In the above-description of various embodiments of the subject disclosure, it is to be understood that the terminology used herein is for the purpose of describing particular embodiments only and is not intended to be limiting of the subject disclosure. Unless otherwise defined, all terms (including technical and scientific terms) used herein have the same meaning as commonly understood by one of ordinary skill in the art to which the subject disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements can be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein can include wirelessly coupled, connected, or responsive. As used herein, the singular forms "a", "an" and "the" are intended to include the plural forms as well, unless the context clearly indicates otherwise. Well-known functions or constructions cannot be described in detail for brevity and/or clarity. The term "and/or" (abbreviated "I") includes any and all combinations of one or more of the associated listed items.

It will be understood that although the terms first, second, third, etc. can be used herein to describe various elements/operations, these elements/operations should not be limited by these terms. These terms are only used to distinguish one element/operation from another element/operation. Thus a first element/operation in some embodiments could be termed a second element/operation in some examples without departing from the teachings of the subject disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," can be used to introduce or specify a general example or examples of a previously mentioned item, and is not intended to be limiting of such item. The common abbreviation "i.e.", which derives from the Latin phrase "id est," can be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the subject disclosure can be embodied in hardware and/or in software (including firmware, resident software, microcode, etc.) that runs on a processor such as a digital signal processor, which can collectively be referred to as "circuitry," "a module" or variants thereof.

It should also be noted that in some alternate implementations, the functions/acts noted in the blocks can occur out of the order noted in the flowcharts. For example, two blocks shown in succession can in fact be executed substantially concurrently or the blocks can sometimes be executed in the reverse order, depending upon the functionality/acts involved. Moreover, the functionality of a given block of the flowcharts and/or block diagrams can be separated into multiple blocks and/or the functionality of two or more blocks of the flowcharts and/or block diagrams can be at least partially integrated. Finally, other blocks can be added/inserted between the blocks that are illustrated, and/or blocks/operations can be omitted without departing from the scope of the subject disclosure. Moreover, although some of the diagrams include arrows on communication paths to show a primary direction of communication, it is to be understood that communication can occur in the opposite direction to the depicted arrows.

Many variations and modifications can be made to the embodiments without substantially departing from the principles of the subject disclosure. All such variations and modifications are intended to be included herein within the scope of the subject disclosure. Accordingly, the above disclosed subject matter is to be considered illustrative, and not restrictive, and the examples of embodiments are intended to cover all such modifications, enhancements, and other embodiments, which fall within the spirit and scope the subject disclosure. Thus, to the maximum extent allowed by law, the scope of the subject disclosure is to be determined by the broadest permissible interpretation of the present disclosure including the examples of embodiments and their equivalents, and shall not be restricted or limited by the foregoing detailed description.

What is claimed is:

1. A method performed by a processor of a data repository, the method comprising:
    receiving, via a network, a file to be stored in the data repository from a terminal;
    determining whether the file has a file metadata card stored in the data repository and that is associated with the file, wherein each file stored in the data repository has a different file metadata card associated with the file, the file metadata card indicating how the file is integrated in a data repository context, wherein the file metadata card includes a plurality of fields organized in hierarchical levels;
    responsive to the file having the file metadata card:
        executing at least one rule specified in the file metadata card responsive to receiving the file to be stored in the data repository to validate the file metadata card; and
        responsive to a result of the at least one rule executed indicating a successful result, storing the file metadata card associated with the file and the file in the data repository,
    wherein executing the at least one rule comprises:
        determining whether a named file is in a linking field included in the plurality of fields of the file metadata card indicating the named file is to be updated when the file to be stored is updated, the named file being a file in the data repository; and
        responsive to the named file is in the linking field indicating the named file is to be updated, initiating transmission of a notification to at least one specified user of the named file to update the named file, and
    responsive to a change to the file being committed to the data repository, performing an operation to ensure the validity of files and file metadata cards stored in the data repository, wherein performing the operation includes:
        ensuring each file has a correct metadata file card associated with the file;
        updating a relational metadata map based on relations in the file such that each file is referenced to other files in the data repository when applicable;
        when any of existing metadata rules applies to the file, assessing compliance with the existing metadata rules; and
        triggering an action indicating compliance or un-compliance with the existing metadata rules.

2. The method of claim 1, wherein the at least one rule comprises at least one of an existence or availability of data or information rule, a consistency of data or information rule, an integrity of data or information rule, or a data or information quality check rule, the method further comprising:
- responsive to a result of a rule of the at least one rule executed indicating a failed result, performing an action.

3. The method of claim 1, further comprising:
- responsive to the file not having the file metadata card:
  - providing a baseline file metadata card to the terminal for a user to populate fields of the baseline file metadata card;
  - responsive to the user populating the fields of the baseline file metadata card:
    - associating the baseline file metadata card with the file as the file metadata card associated with the file; and
    - storing the file metadata card associated with the file and the file in the data repository.

4. The method of claim 3, further comprising:
- responsive to a linking field of the file metadata card being populated with a named file:
  - updating the relational metadata map based on the named file to add a representation of a link between the file and the named file; and
  - adding a name of the file to the linking field of a named file metadata file card associated with the named file.

5. The method of claim 1, further comprising:
- responsive to the file not having the file metadata card:
  - determining a file type of the file;
  - determining a file metadata card template based on the file type;
  - providing the file metadata card template to the terminal for a user to populate fields of the file metadata card template;
  - responsive to the user populating the fields of the file metadata card template:
    - executing the at least one rule to validate the file metadata card; and
    - responsive to the result of the at least one rule executed being a successful result:
      - storing the file metadata card template as the file metadata card associated with the file in the data repository; and
      - storing the file in the data repository.

6. The method of claim 1, further comprising creating the metadata file card by:
- creating a baseline information section comprising baseline metadata having common information for all files in the data repository, wherein the baseline metadata comprises at least one of a file name, a file description, a date of creation, a date of modification, an identification of a version, or an identification of an author;
- creating at least one of a general product lifecycle implementation section or a product component implementation section, wherein:
  - creating the general product lifecycle implementation section comprises creating general product lifecycle metadata associated with the file, wherein the general product lifecycle metadata comprises a file name and at least one of a file unique identifier (ID), a file maturity state, a file revision status, a file description, a date of creation, a date of modification, an identification of a version, an identification of a file owner, or an identification of an author; and
  - creating the product component implementation section comprises creating product component information associated with the file, wherein the product component information comprises information on at least one of information on virtual product component implementation metadata, related to the product component implementation section, usage and execution associated with the file that represents a product component or subsystem, or specific model metadata that can comprise at least one of a file validity range, a file fidelity, a port, a parameter, a start condition, an initial condition, a physical domain, a validation level, a file execution environment, a solver setting, one or more external libraries, a real time computation setting, an implementation language, an implementation tool, or a compiler.

7. The method of claim 1, further comprising:
- receiving at least one file metadata card template and a file type to be associated with the at least one file metadata card template from an authorized user to add to the data repository; and
- adding the at least one file metadata card template to the data repository with an indication of the file type to be associated with the at least one file metadata card template.

8. The method of claim 1, wherein the triggered action comprises a notification indicating the compliance or the un-compliance with the existing metadata rules.

9. A server that links files stored in a data repository, the server comprising:
- processing circuitry; and
- memory coupled with the processing circuitry, wherein the memory comprises instructions that when executed by the processing circuitry causes the server to perform operations comprising:
  - receiving, via a network, a file to be stored in the data repository from a terminal;
  - determining whether the file has a file metadata card stored in the data repository and that is associated with the file, wherein each file stored in the data repository has a different file metadata card associated with the file, the file metadata card indicating how the file is integrated in a data repository context, wherein the file metadata card includes a plurality of fields organized in hierarchical levels;
  - responsive to the file having the file metadata card:
    - executing at least one rule specified in the file metadata card responsive to receiving the file to be stored in the data repository to validate the file metadata card; and
    - responsive to a result of the at least one rule executed being a successful result, storing the file metadata card associated with the file and the file in the data repository,
  - wherein executing the at least one rule comprises:
    - determining whether a named file is in a linking field included in the plurality of fields of the file metadata card indicating the named file is to be updated when the file to be stored is updated, the named file being a file in the data repository; and
    - responsive to the named file is in the linking field indicating the named file is to be updated, initiating transmission of a notification to at least one specified user of the named file to update the named file, and
  - responsive to a change to the file is committed to the data repository, performing an operation to ensure the validity of files and file metadata cards stored in the data repository, wherein performing the operation includes:

ensuring each file has a correct metadata file card associated with the file;

updating a relational metadata map based on relations in the file such that each file is referenced to other files in the data repository when applicable;

when any of existing metadata rules applies to the file, assessing compliance with the existing metadata rules; and triggering an action indicating compliance or un-compliance with the existing metadata rules.

10. The server of claim 9, wherein the operations further comprise:

responsive to a result of a rule executed of the at least one rule indicating a failed result, performing an action.

11. The server of claim 9, wherein the operations further comprise:

responsive to the file not having the file metadata card:
providing a baseline file metadata card to the terminal for a user to populate fields of the baseline file metadata card;

responsive to the user populating the fields of the baseline file metadata card:
associating the baseline file metadata card with the file as the file metadata card associated with the file; and
storing the file metadata card associated with the file and the file in the data repository.

12. The server of claim 11, wherein the operations further comprise:

responsive to a linking field of the file metadata card being populated with a named file:
updating the relational metadata map based on the named file to add a representation of a link between the file and the named file; and
adding a name of the file to the linking field of the file metadata file associated with the named file.

13. The server of claim 9, wherein the operations further comprise:

responsive to the file not having the file metadata card:
determining a file type of the file;
determining a file metadata card template based on the file type;
providing the file metadata card template to the terminal for a user to populate fields of the file metadata card template;
responsive to the user populating the fields of the file metadata card template:
storing the file metadata card template as the file metadata card associated with the file in the data repository; and
storing the file in the data repository.

14. The server of claim 9, wherein the operations further comprise:

determining whether the file metadata card should be changed to a different file metadata card type based on a program stage of a development program associated with the file; and
responsive to determining the file metadata card should be changed, changing the file metadata card based on the program stage of the development program.

15. The server of claim 9, wherein the operations further comprise:

receiving at least one file metadata card template and a file type associated with the at least one file metadata card template from an authorized user to add to the data repository; and adding the at least one file metadata card template with an indication of the file type to be associated with the at least one file metadata card template.

16. The server of claim 9, wherein the triggered action comprises a notification indicating the compliance or the un-compliance with the existing metadata rules.

17. A computer program product comprising a non-transitory storage medium comprising program code to be executed by processing circuitry of a computing device configured to operate in a network, whereby execution of the program code causes the computing device to perform operations comprising:

receiving, from a terminal via the network, a file to be stored in a data repository;

determining whether the file has a file metadata card stored in the data repository and that is associated with the file, wherein each file stored in the data repository has a different file metadata card associated with the file, the file metadata card indicating how the file is integrated in a data repository context;

responsive to determining that the file has the file metadata card:
executing at least one rule specified in the file metadata card responsive to receiving the file to be stored in the data repository to validate the file metadata card; and
responsive to the file metadata card being validated, storing the file metadata card associated with the file and the file in the data repository, wherein executing the at least one rule comprises:
determining whether a named file is in a linking field of the file metadata card indicating the named file is to be updated when the file to be stored is updated, the named file being a file in the data repository; and
responsive to the named file is in the linking field indicating the named file is to be updated, initiating transmission of a notification to at least one specified user of the named file to update the named file, and responsive to a change to the file is committed to the data repository, performing an operation to ensure the validity of files and file metadata cards stored in the data repository, wherein performing the operation includes:
ensuring each file has a correct metadata file card associated with the file;
updating a relational metadata map based on relations in the file such that each file is referenced to other files in the data repository when applicable;
when any of existing metadata rules applies to the file, assessing compliance with the existing metadata rules; and
triggering an action indicating compliance or un-compliance with the existing metadata rules.

18. The computer program product of claim 17, wherein the operations further comprise:

responsive to a result of a rule executed of the at least one rule indicating a failed result, performing an action.

19. The computer program product of claim 17, wherein the operations further comprise:

responsive to the file not having the file metadata card:
determining a file type of the file;
determining a file metadata card template based on the file type;
providing the file metadata card template to the terminal for a user to populate fields of the file metadata card template; and
responsive to the user populating the fields of the file metadata card template:

executing the at least one rule to validate the file metadata card; and responsive to a result of the at least one rule executed being a successful result:

storing the file metadata card template as the file metadata card associated with the file in the data repository; and storing the file in the data repository.

20. The computer program product of claim 17, wherein the triggered action comprises a notification indicating the compliance or the un-compliance with the existing metadata rules.

\* \* \* \* \*